United States Patent
Ong et al.

(10) Patent No.: US 11,861,271 B2
(45) Date of Patent: Jan. 2, 2024

(54) METHOD FOR POLYMERIZING SUPERFICIAL FEATURES IN 3D-PRINTED PARTS

(71) Applicant: Stratasys, Inc., Eden Prairie, MN (US)

(72) Inventors: Joel Ong, Eden Prairie, MN (US); Christopher Prucha, Eden Prairie, MN (US); Marshall Ling, Eden Prairie, MN (US); Elton Cheung, Eden Prairie, MN (US)

(73) Assignee: Stratasys, Inc., Eden Prairie, MN (US)

( * ) Notice: Subject to any disclaimer, the term of this patent is extended or adjusted under 35 U.S.C. 154(b) by 0 days.

(21) Appl. No.: 18/098,586

(22) Filed: Jan. 18, 2023

(65) Prior Publication Data
US 2023/0229825 A1    Jul. 20, 2023

Related U.S. Application Data

(60) Provisional application No. 63/300,621, filed on Jan. 18, 2022.

(51) Int. Cl.
*G06F 30/17* (2020.01)
*G06F 113/10* (2020.01)
(Continued)

(52) U.S. Cl.
CPC ............ *G06F 30/17* (2020.01); *B22F 12/00* (2021.01); *B29C 64/393* (2017.08); *B33Y 10/00* (2014.12);
(Continued)

(58) Field of Classification Search
CPC ..... G06F 30/17; G06F 2113/10; B33Y 10/00; B33Y 50/02; B29C 64/393; B22F 12/00; B28B 1/001
(Continued)

(56) References Cited

U.S. PATENT DOCUMENTS

2016/0067740 A1 * 3/2016 Voris ............... B33Y 10/00
                                              425/150
2019/0210284 A1 * 7/2019 Bosveld ........... B29C 64/25
(Continued)

FOREIGN PATENT DOCUMENTS

WO       2019195062 A1    10/2019
WO    WO-2019195062 A1 * 10/2019 ......... B22F 10/28

OTHER PUBLICATIONS

International Search Report and Written Opinion for International Patent Application No. PCT/US2023/011052 dated Apr. 14, 2023; 11 pages.

(Continued)

*Primary Examiner* — John E Johansen
(74) *Attorney, Agent, or Firm* — Run8 Patent Group, LLC; Peter Miller

(57) ABSTRACT

A method includes: accessing a part model comprising a three-dimensional representation of a part; accessing a material profile relating exposure energy and three-dimensional polymerization geometry of a material selected for the part; segmenting the part model into a set of model layers; detecting a first upward-facing surface in the part model; defining a first model volume in a first model layer, adjacent the first upward-facing surface, and fully contained within the part model; based on the material profile, calculating a first exposure energy predicted to yield a first three-dimensional polymerization geometry approximating a first contour of the first upward-facing surface when projected onto the material during a build; populating a first print image with the first exposure energy in a first image area corresponding to the first model volume in the first model layer; and storing the first print image in a print file for the part.

20 Claims, 5 Drawing Sheets

(51) Int. Cl.
  *B29C 64/393*   (2017.01)
  *B33Y 50/02*    (2015.01)
  *B22F 12/00*    (2021.01)
  *B33Y 10/00*    (2015.01)
  *B28B 1/00*     (2006.01)
(52) U.S. Cl.
  CPC .............. *B33Y 50/02* (2014.12); *B28B 1/001* (2013.01); *G06F 2113/10* (2020.01)
(58) Field of Classification Search
  USPC ............................................................ 703/1
  See application file for complete search history.

(56)             References Cited

U.S. PATENT DOCUMENTS

2019/0389134 A1*  12/2019  Woytowitz ............ B29C 64/386
2020/0004215 A1*  1/2020   Ramirez Muela ...... B29C 64/40

OTHER PUBLICATIONS

Notification of the International Application Number and the International Filing Date for International Application No. PCT/US2023/011052 dated Feb. 13, 2023; 1 page.

* cited by examiner

METHOD FOR POLYMERIZING SUPERFICIAL FEATURES IN 3D-PRINTED PARTS

CROSS REFERENCE TO RELATED APPLICATIONS

This application claims the benefit of U.S. Provisional Application No. 63/300,621, filed on 18 Jan. 2022, which is incorporated in its entirety by this reference.

This application is related to U.S. patent application Ser. No. 17/856,860, filed on 1 Jul. 2022, Ser. No. 17/173,174, filed on 10 Feb. 2021, Ser. No. 16/852,078, filed on 17 Apr. 2020, Ser. No. 16/672,410, filed on 1 Nov. 2019, and Ser. No. 16/672,415, filed on 1 Nov. 2019, each of which is incorporated in its entirety by this reference.

TECHNICAL FIELD

This invention relates generally to the field of additive manufacturing and more specifically to a new and useful method for polymerizing superficial features in 3D-printed parts in the field of additive manufacturing.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
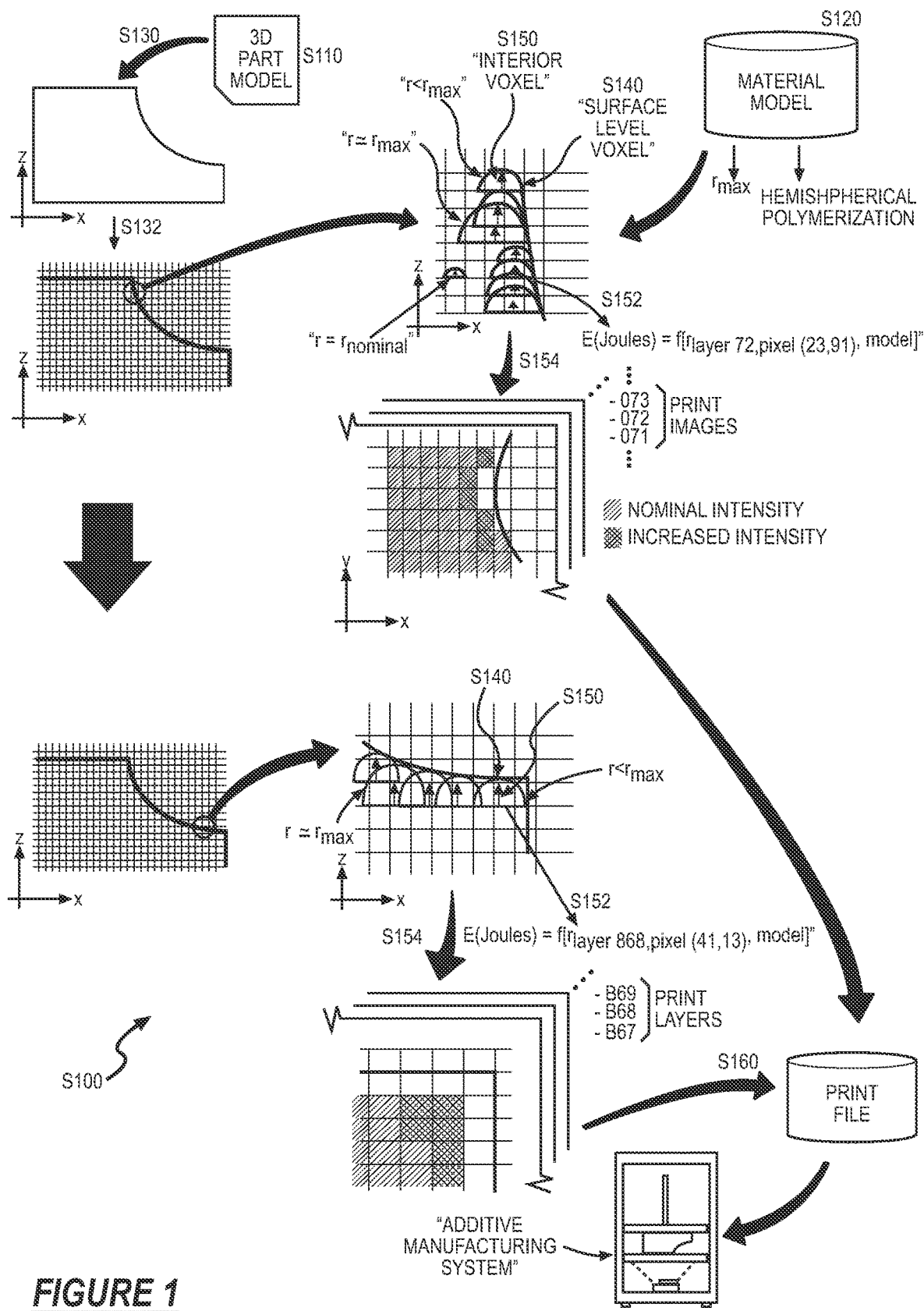
FIG. 1 is a flowchart representation of a method.
Figure 2:
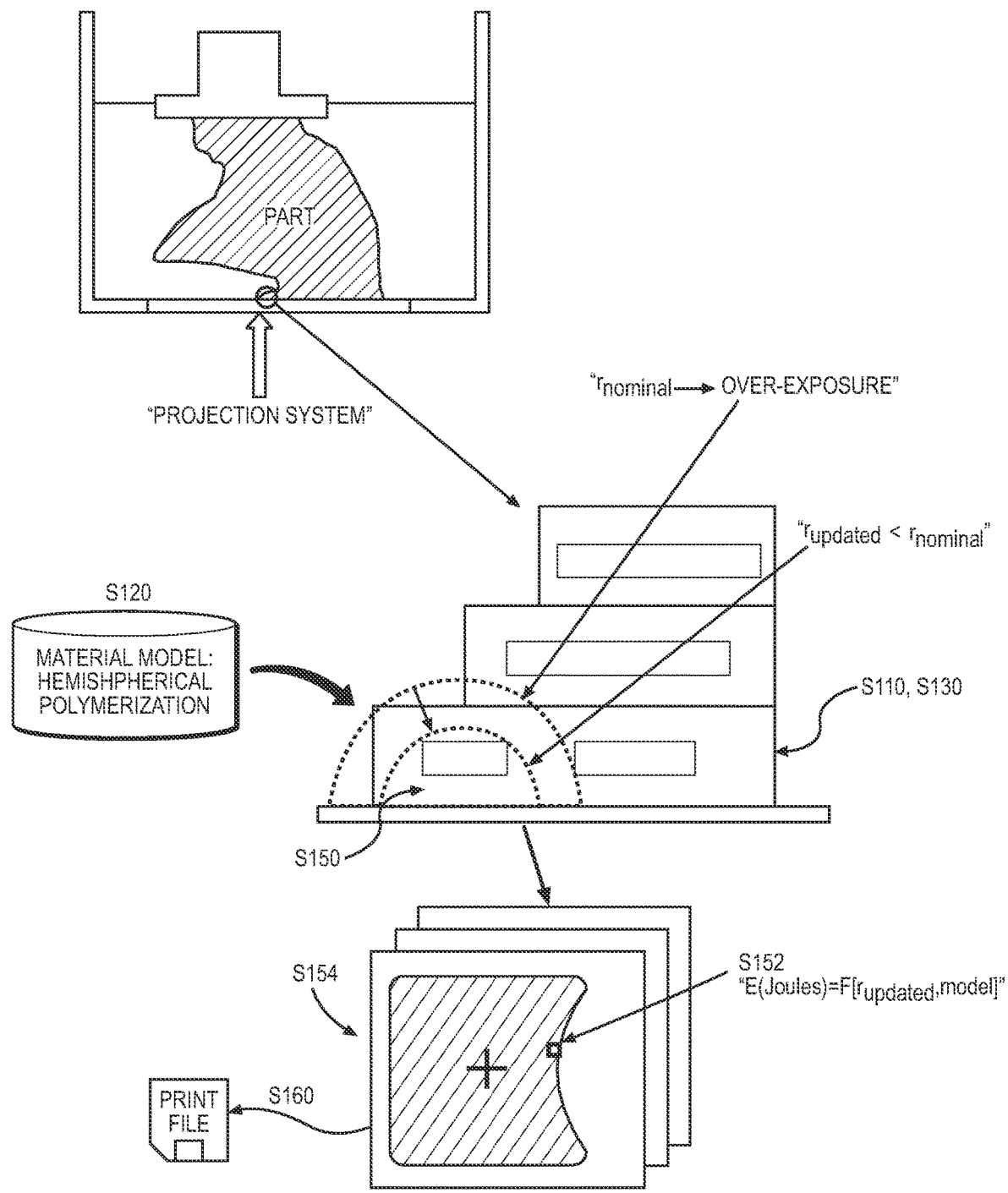
FIG. 2 is a flowchart representation of one variation of the method.

As shown in FIGS. 1 and 2, a method includes: accessing a part model comprising a three-dimensional representation of a part in Block S110; accessing a material profile of a material selected for the part, the material profile relating exposure energy and three-dimensional polymerization geometry of the material in Block S120; segmenting the part model into a set of model layers in Block S130; detecting a first upward-facing surface in the part model in Block S140; defining a first model volume in a first model layer in the set of model layers, adjacent the first upward-facing surface, and fully contained within the part model in Block S150; based on the material profile, calculating a first exposure energy predicted to yield a first three-dimensional polymerization geometry approximating a first contour of the first upward-facing surface when this exposure energy is projected onto the material during a build in Block S152; populating a first print image with the first exposure energy in a first image area corresponding to the first model volume in the first model layer in Block S154; and storing the first print image in a print file for the part in Block S160.

1.1 Variation: Steep Surface Contour

Figure 4:
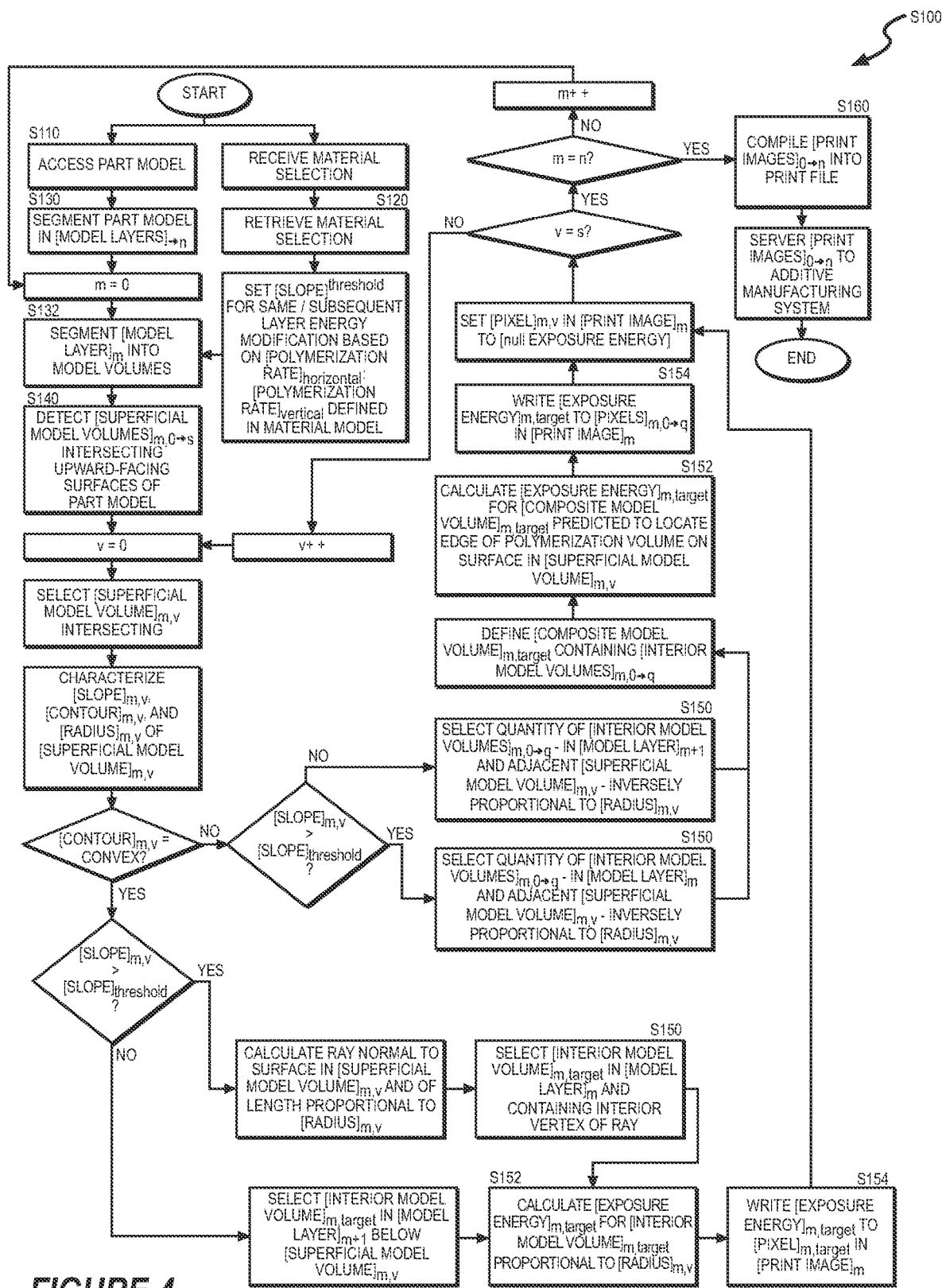
FIG. 4 is a flowchart representation of one variation of the method.

As shown in FIGS. 1 and 4, one variation of the method S100 includes: accessing a part model comprising a three-dimensional representation of a part in Block S110; accessing a material profile of a material selected for the part, the material profile relating exposure energy and three-dimensional polymerization geometry of the material in Block S120; segmenting the part model into a set of model layers in Block S130; segmenting a first model layer, in the set of model layers, into a first set of model volumes in Block S132; detecting a first superficial (or "surface-level") model volume, in the first set of model volumes of the first model layer, intersecting a first upward-facing surface of the part model in Block S140; selecting a first interior model volume, in the first set of model volumes of the first model layer, fully contained within the part model in Block S150; based on the material profile, calculating a first exposure energy predicted to yield a first three-dimensional polymerization geometry approximating a first contour of the first upward-facing surface contained within the first superficial model volume when this exposure energy is projected onto the material during a build in Block S152; populating a first print image with the first exposure energy in a first image area corresponding to the first interior model volume in the first model layer in Block S154; and storing the first print image in a print file for the part in Block S160.

1.2 Variation: Shallow Surface Contour

As shown in FIGS. 1, 2, and 4, another variation of the method S100 includes: accessing a part model including a three-dimensional representation of a part in Block S110; accessing a material profile of a material selected for the part, the material profile relating exposure energy and three-dimensional polymerization geometry of the material in Block S120; segmenting the part model into a set of model layers in Block S130; segmenting a first model layer, in the set of model layers, into a first set of model volumes in Block S132; segmenting a second model layer, in the set of model layers and above the first model layer, into a second set of model volumes in Block S132; detecting a first superficial model volume, in the second set of model volumes of the second model layer, intersecting a first upward-facing surface of the part model in Block S140; selecting a first interior model volume, in the first set of model volumes of the first model layer below the second superficial model volume and fully contained within the part model in Block S150; based on the material profile, calculating a first exposure energy predicted to yield a first three-dimensional polymerization geometry approximating a first contour of the first upward-facing surface contained within the first superficial model volume when this exposure energy is projected onto the material during a build in Block S152; populating a first print image with the first exposure energy in a first image area corresponding to the first interior model volume in the first model layer in Block S154; and storing the first print image in a print file for the part in Block S160.

2. Applications

As shown in FIGS. 1 and 4, the method S100 can be executed by a computer system in conjunction with an additive manufacturing system (shown in FIG. 5) to achieve sub-voxel control of polymerization of material within upward-facing surfaces of a part during a print cycle, such as to increase dimensional accuracy of superficial (i.e., surface-level and surface-adjacent) features on the part and/or achieve or improve textural consistency and/or surface quality across the part. In particular, the computer system can: access a part model defining a virtual volume representing a part; access a material profile that predicts scope of one- or three-dimensional polymerization of a material selected for the part based on irradiation intensity and/or irradiation duration; project a three-dimensional grid array of voxels representing resolution of a projection system within an additive manufacturing system (e.g., a "3D SLA printer") and a target layer thickness for the part; identify surface-level voxels containing upward-facing surfaces (or "overhangs," surfaces facing a build platform of the additive manufacturing system) within the virtual volume of the part model; select interior voxels near these surface-level voxels; implement the material profile to set exposure energies (e.g., irradiation intensities and durations) for the interior voxels such that the predicted scope of polymerization around these interior voxels extends up to and approximates the surfaces defined in the nearby surface-level voxels.

For example, a computer system can execute these Blocks of the method S100 to: calculate an exposure energy—for an interior volume of a 3D-printed part—that will yield a three-dimensional volume of polymerized material (or "resin") that extends beyond the interior volume of the part to approximate a three-dimensional surface contour defined in a three-dimensional part model; write this exposure energy to a set of pixels in a print image corresponding to the interior volume; compile this print image and others into a print file; and to serve this print file to an additive manufacturing system. The additive manufacturing system then selectively exposes sequential layers of the material to energy (e.g., ultraviolet light) according to these print images to polymerize select regions of these layers and thus form the part, which may thus exhibit surface characteristics and dimensions that closely approximate the three-dimensional part model.

2.1 Steep v. Shallow Surface Contour

For example, a material (or "resin") selected for a part may polymerize in semi-ellipsoidal three-dimensional geometry. Depth of polymerization of the material along an axis of energy exposure is less than a radius of polymerization of the material perpendicular to the axis of energy exposure. Accordingly, a semi-ellipsoidal polymerized volume of the material may exhibit: a steepest slope near a base of the polymerized volume; and a shallowest slope near a base of the polymerized volume. A material model can thus store these polymerization characteristics of the material.

Upon ingest of a part model, the computer system can characterize slopes of surfaces within the part model, such as contained within discrete voxel volumes projected onto the part model. Then, for a first surface characterized by a steep slope (e.g., greater than 45° from a horizontal x-y plane) and contained in a first voxel in a first model layer of the part model, the computer system can: select a second voxel in the same model layer and inset from the first voxel; and calculate a second energy exposure predicted to yield both polymerization (e.g., to a minimum green strength) within a volume of the part corresponding to the second voxel and polymerization that extends laterally beyond this volume of the part to approximate the first, steep surface defined in the part model. Accordingly, the computer system can: write a null energy exposure to a first pixel corresponding to the first voxel in a first print image for the part; and write the second energy exposure to a second pixel corresponding to the second voxel in the first print image.

Conversely, for a second surface characterized by a shallow slope (e.g., less than 45° from the horizontal x-y plane) and contained in a third voxel in the first layer of the part model, the computer system can: select a fourth voxel in a second, lower layer (and therefore printed after the first layer) and located below the third voxel; and calculate a fourth energy exposure predicted to yield both polymerization within a volume of the part corresponding to the fourth voxel and polymerization that extends vertically beyond this volume to approximate the second, shallow surface defined in the part model. Accordingly, the computer system can: write a null energy exposure to a third pixel corresponding to the third voxel in the first print image; and write the fourth energy exposure to a fourth pixel corresponding to the fourth voxel in a second print image succeeding the first print image in a print file for the part.

2.2 Part Green Strength v. Tolerances

Generally, the interior volume of a newly-printed part may predominantly contribute to strength of the part. Accordingly, the computer system can prioritize dimensional accuracy and surface profile (e.g., texture) over green strength across the surface of the part. In particular, the computer system can execute the method S100 to set exposure energies (e.g., irradiation intensities and durations) of interior voxels within the part—based on a material profile of the selected part material—to achieve polymerization that extends beyond these interior voxels to reach and approximate contours of nearby exterior surfaces prescribed in the part model.

In particular, when a region of a volume of resin—arranged over a build window in the additive manufacturing system—is exposed to radiation (e.g., "light"), monomers and/or oligomers in the exposed region of resin cross-link to form polymers and thus form a solid layer of a part (i.e., a "print layer"). However, a polymerized region of the volume of resin may differ from the exposed region of the volume of resin. For example, over-exposure of the resin due to greater exposure energy may cause polymerization of the resin to: extend laterally past the exposed region such that the polymerized region of the resin layer is larger than the exposed region; and/or extend upwardly to a preceding print layer of the part, thereby polymerizing uncured resin present on the surface of the preceding print layer. The computer system can thus leverage these characteristics of a resin (hereinafter the "material") to selectively over-expose interior voxels in order to achieve polymerization of the material in neighboring surface-level voxels that approximates the surface profiles prescribed in these surface-level voxels by the part model.

2.2 Computer System

Generally, the method S100 is described as executed by a computer system before and in preparation for printing a part at the additive manufacturing system. Additionally or alternatively, Blocks of the method S100 can be executed in part or in whole by the additive manufacturing system, such as in real-time while printing the part. Furthermore, the method S100 is described herein as executed by a computer system to define exposure energies for surface-level and surface-adjacent voxels of a part. However, the method S100 can be similarly executed by a computer system to define exposure energies (e.g., irradiation intensities within a fixed exposure duration, irradiation intensity profiles over a period of time) for surface-level and surface-adjacent voxels of a part.

2.3 Disclaimers

Furthermore, the method S100 is described below as executed by the computer system to: segment a part model into a sequence of model layers of common thickness; to define a two-dimensional array of voxels in each model layer, wherein each voxel corresponds to the field of view of a pixel—in a projection system of an additive manufacturing system—at a build window of the additive manufacturing system; and to selectively adjust exposure energies assigned to interior voxels adjacent surface-level voxels in the part model. However, the computer system can additionally or alternatively implement these methods and techniques to adjust exposure energies for: larger fixed clusters of interior voxels (e.g., 2-by-2 voxel clusters) within a layer of the part model; clusters of voxels of variable size; or for discrete sub-volumes with the part model not bounded or defined by fields of view of pixels in the projection system.

The method S100 is further described below as executed by the computer system to selectively increase exposure energies—from a nominal exposure intensity—of select interior volumes adjacent upward-facing surfaces of a part in order to improve dimensional and geometric tolerances of the part. However, the computer system can implement similar methods and techniques to increase exposure energies of select interior volumes adjacent downward-facing surfaces of the part. Additionally or alternatively, the computer system can implement similar methods and techniques to decrease exposure energies—from a nominal exposure intensity—of select volumes containing surfaces of the part in order to improve dimensional and geometric tolerances of the part.

3. Terms

A "voxel" is referred to herein: as a volume of layer of a part falling within the field of view of a pixel of a projection system of an additive manufacturing system when this layer of the part is fabricated across a build window of the additive manufacturing system; and as a corresponding model volume in model layer of a part model.

A "surface-level voxel" or ("surface-level model volume") is referred to herein as a voxel (or model volume) that intersects a surface defined in the part model.

An "interior voxel" (or "interior model volume") is referred to herein as a voxel (or model volume) that is fully contained within a scope of the part model and that does not intersect a surface defined in the part model.

4. Additive Manufacturing System

Figure 5:
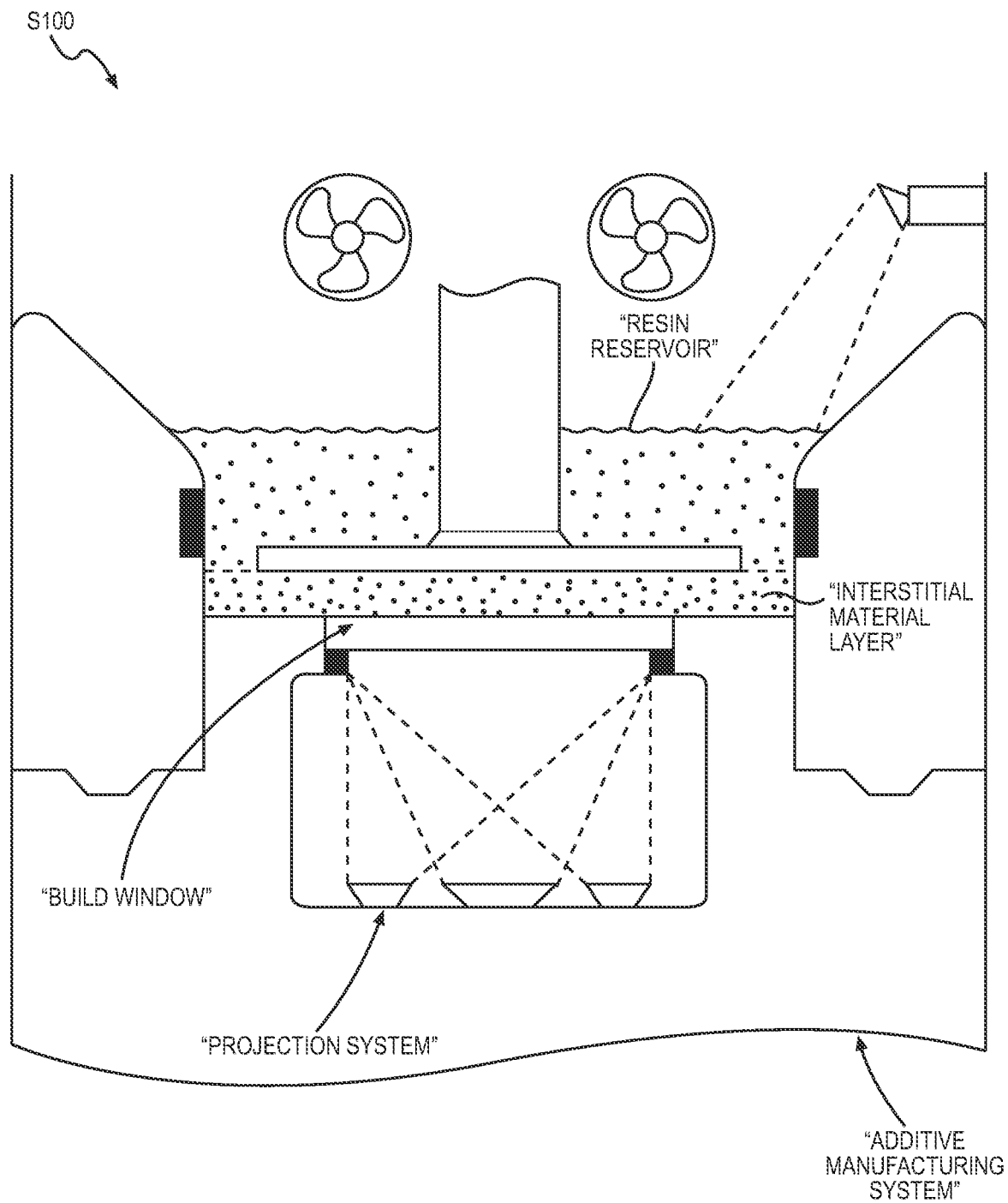
FIG. 5 is a schematic representation of one variation of the method.

In one implementation shown in FIG. 5, the computer system interfaces with an additive manufacturing system as described in U.S. patent application Ser. No. 16/672,415. The additive manufacturing system is configured to print a part according to a print file—containing a sequence of print images—generated by the computer system according to the method S100.

Therefore, the method S100 can be executed by a computer system in conjunction with a additive manufacturing system to modulate intensity and duration of light energy directed to voxels defining upward-facing surfaces of a part in order to: a) achieve a target green strength; b) prevent resin from polymerizing on upward-facing surfaces of the part beyond the target geometry of the part while the part remains immersed in liquid resin; and thus c) achieve improved surface quality and dimensional accuracy on upward-facing surfaces of the part.

Furthermore, polymerization effects resulting from light exposure within the additive manufacturing system may be material dependent, such as based on opacity of a resin material in unexposed, exposed, and polymerized states and based on pigmenting, photoinhibitors, or other components added to the resin. Therefore, the method S100 can further be executed by a computer system in conjunction with a additive manufacturing system to enable the additive manufacturing system to generate parts of improved dimensional tolerance with more challenging resin materials.

The method S100 is described herein as executed in conjunction with and/or by a additive manufacturing system containing a DLP projection system. However, the method S100 can executed in conjunction with and/or by a additive manufacturing system containing a laser, NIR, and/or other type of projection system.

5. Part Model

Block S110 of the method S100 recites accessing a part model comprising a three-dimensional representation of a part.

In one implementation, the computer system accesses (or "ingests") a 3D part model, such as uploaded by a user or retrieved from a local or remote database. For example, the part model can include: a solid model defining a volume of a 3D part between its interior or exterior surfaces; or a mesh defining target interior and exterior surfaces of the 3D part.

6. Model Annotation and Modification

The computer system can then: render the 3D part model within a user interface; render 3D part model in the user interface; detect interior and/or exterior surfaces within the 3D part model; and highlight these surfaces within the user interface or otherwise prompt the user to annotate these surfaces with dimensional, surface finish (or "texture"), and/or other target characteristics.

6.1 Surface Segmentation

In one example, the computer system detects a constellation of vertices and edges in 3D part model. Then, based on these vertices and edges, the computer system defines a set of abutting (i.e., non-overlapping) surface sectors: that cooperate to span all interior and exterior surfaces of the 3D part model; and that individually define the shortest perimeter lengths between vertices and along edges in the 3D part model.

In another example, the computer system: defines a grid density; projects a mesh—at the grid density—onto the interior and exterior surfaces of the 3D part model; snaps gridlines in the mesh onto vertices and edges detected in the 3D part model; and then defines a surface sector within each grid unit in the mesh. In this example, the computer system can set the grid density such that each surface sector approximates a target surface area (e.g., one centimeter), such as preset or selected by the user via a slider rendered within the user interface. Alternatively, the computer system can set the grid density such that each surface sector approximates a target proportion (e.g., 5%) of the total surface area of the 3D part model, such as preset or selected by the user via a slider rendered within the user interface.

Therefore, in the preceding examples, the computer system can apply a uniform grid density across an entire 3D part model. Alternatively, the computer system can enable user to isolate subregions of the 3D part model, such as: by selecting subvolumes (e.g., bosses, extrusions) and/or subsurfaces (e.g., cavities) delineated by edges or faces in the 3D part model; or by manually drawing, selecting, or delineating subvolumes or subsurfaces within the 3D part model. The computer system can then project a mesh—and therefore define a surface sector area—onto each subregion in the 3D part model according to its designated grid density.

However, the computer system can implement any other method or technique to delineate surface sectors on interior and/or exterior surfaces of the 3D part model. The computer system can then interface with the user to assign characteristics to individual surface sectors or groups of surface sectors within the part model.

6.2 Dimensional Accuracy

The computer system can then populate surface sectors within the 3D part model with quantitative or qualitative dimensional tolerances, such as including: distances between features; lengths of features; flatness callouts; parallelism callouts; cylindricity; and/or over-under tolerance callouts.

In one implementation, the 3D part model: defines a nominal part geometry; and includes dimensions and/or dimensional tolerances on various faces, edges, and vertices. Therefore, in this implementation, the computer system can: extract geometric dimensional tolerances from the 3D part model; interpret thickness, straightness, flatness, and/or cylindricity tolerances, etc. for subvolumes and/or subsurfaces from dimensional tolerances contained in the 3D part model; and project these tolerances onto corresponding surface sectors across the interior and exterior surfaces of the 3D part model.

In a similar implementation, the computer system: accesses an engineering drawing associated with the 3D part model; extracts dimensional tolerances from the engineering drawing; and projects these tolerances onto corresponding surface sectors across the interior and exterior surfaces of the 3D part model.

In another implementation, the computer system interfaces with the user to manually annotate surface sectors (or subvolumes or subsurfaces more generally) within the 3D part model with dimensional tolerances.

Alternatively, in the foregoing implementations, the computer system can: abstract dimensional tolerances to a range of dimensional abstractions, such as including: "loose" dimensional control (e.g., up to +/−0.010" from a nominal dimension); "moderate" dimensional control (e.g., up to +/−0.005" from a nominal dimension); and "tight" dimensional control (e.g., up to +/−0.0010" from a nominal dimension). The computer system can then write these dimensional abstractions to individual surface sectors within the 3D part model.

Therefore, the computer system can assign absolute (e.g., quantitative) or abstract (e.g., qualitative) tolerances to individual surface sectors within the 3D part model.

6.3 Surface Finish

The computer system can similarly populate surface sectors within the 3D part model with target surface finishes (or "textures"). For example, a target surface finish can specify a surface finish type, such as: surface roughness (e.g., "Ra"); lay pattern (e.g., vertical, horizontal, radial, cross-hatched, circular, isotropic, concave dimple, convex dimple); or waviness. The target surface finish can additionally or alternatively include a specification, such as: material removal not allowed or required; tolerance direction (e.g., upper or lower); filter (e.g., noise or waviness); and/or dimple (e.g., direction, depth, width).

In one implementation, the 3D part model (or an associated engineering drawing) contains surface finish callouts. Accordingly, the computer system can project these surface finish callouts onto corresponding subvolumes and/or subsurfaces—and therefore onto surface sectors—within the 3D part model.

Alternatively, the computer system can interface with the user to manually annotate surface sectors (or subvolumes or subsurfaces more generally) within the 3D part model with surface finish callouts.

Additionally or alternatively, in the foregoing implementations, the computer system can: qualitative surface finishes to a range of surface finish abstractions, such as including: "mirror," "smooth," "rough"; or gloss, semi-gloss, satin, matte, flat. The computer system can then write these surface finish abstractions to individual surface sectors within the 3D part model.

Therefore, the computer system can assign qualitative surface finish callouts to individual surface sectors within the 3D part model.

6.4 Surface Finish and Texture Projection

Furthermore, in one variation, the computer system projects a three-dimensional representation of a specified texture onto each surface sector of the part model.

In one implementation, the computer system accesses a parametric or non-parametric texture model that converts surface finish callouts into textural 3D surface map(s), which the computer system can then project onto the surface of the part model.

For example, the texture model can link: a) lay patterns (e.g., horizontal, radial, cross-hatched, circular, isotropic, concave dimple, and/or convex dimple lay patterns) defined in surface finish callouts; to b) 3D texture profiles (e.g., 2D sawtooth, sinusoidal, square-wave profiles). The texture model can also: convert profile depth defined in a surface finish callout into 2D texture profile amplitude; and convert outset proportion, inset proportion, or "on" layer edge specification in a surface finish callout into an offset between the neutral plane of a 3D texture profile and the surface of the part model.

Accordingly, for a first surface sector in the 3D part model, the computer system can implement the texture model to transform a surface finish callout in the first surface sector into a 3D texture profile, a profile amplitude, and/or a neutral plane offset, etc. The computer system can then project the 3D texture profile—at the profile amplitude—onto the first surface sector in the part model. The computer system can then repeat this process for each other surface segment in the part model.

7. Material Selection and Material Profile

Block S120 of the method S100 recites accessing a material profile of a material selected for the part, the material profile relating exposure energy and three-dimensional polymerization geometry of the material. Generally, in Block S120, the computer system can: receive a material selection for the 3D part model, such as from a menu of available resin formulas currently available for processing in the additive manufacturing system or by extracting a material specification from the 3D part model; and then retrieve a material profile for the selected material.

In particular, the computer system can retrieve a material profile that defines correlations (e.g., relationships) between: print parameters (e.g., print layer thickness, light-shell thickness and step size, light-shell exposure intensity, light-shell exposure duration); print outcomes (e.g., intra- and inter-layer dimensional tolerance, polymerization bleed between print layers, surface finish, surface texture, green strength); and part characteristics (e.g., cross-sectional of features, vertical and horizontal aspect ratios of features). For example, the material profile can be generated empirically based on results of (many) parts of different geometries and characteristics printed on the same or other additive manufacturing system(s), such as described in U.S. patent application Ser. No. 17/173,174.

In one implementation, the material profile includes a working curve that defines a relationship between irradiation energy (or energy intensity) and polymerization depth (e.g., in one dimension parallel to an irradiation direction or in three dimensions relative to the irradiation direction) for the material. In one example, the working curve includes a logarithmic function (or "curve") that relates: critical energy (i.e., to initiate polymerization); depth of polymerization penetration (e.g., cured film thickness through the depth of a part layer) from a surface exposed to the critical energy; and width of polymerization from the boundary of the surface exposed to the critical energy.

In a similar implementation, the material profile for the material includes a) a first working curve that predicts horizontal polymerization (i.e., lateral and longitudinal polymerization in an x-y plane through a layer of the material) and b) a second working curve that predicts vertical polymerization (i.e., depth of polymerization along a z-axis perpendicular to the layer of the material), both as a function of: exposure area (e.g., the width and length of the field of view of a pixel in the projection system at the build window of the additive manufacturing system); exposure intensity within the exposure area; exposure duration; wavelength of light; and/or environmental conditions (humidity, temperature, presence of ambient gas) within the additive manufacturing system. For example, the material profile can predict: horizontal polymerization of the material at a first rate proportional to exposure energy; and vertical polymerization of the material at a second rate—less than the first rate—proportional to exposure energy. Thus, in this example, the material profile can predict a three-dimensional polymerized volume of the material that approximates: a hemisphere at low exposure energies; and a flat, wide semi-ellipsoid at high exposure energies.

In another implementation, the material profile can define a polymerization radius—from a center of an exposure area—as a function of exposure energy (e.g., an combination or integral of exposure intensity over exposure duration). For example, the material profile can predict a hemispherical polymerization volume—characterized by a spherical radius proportional to exposure energy—for the material.

8. 3D Part Model Segmentation

Blocks S130 and S132 recite: segmenting the part model into a set of model layers; segmenting a first model layer, in the set of model layers, into a first set of model volumes; and/or segmenting a second model layer, in the set of model layers, into a second set of model volumes. Generally and as shown in FIGS. 1, 2, and 4, in Blocks S130 and S132, the computer system can segment the three-dimensional part model into a three-dimensional array of voxels, wherein each voxel: defines a depth corresponding to a thickness of the layer of the part model containing the voxel; and an area bounded by a field of view of a corresponding pixel—in an x-y plane at the build window—in the projection system of the additive manufacturing system. In particular, in this variation, the computer system can segment the part model into discrete voxels of common three-dimensional geometry, including: surface-level voxels that intersect surfaces of the part model; and interior voxels that are fully contained within the part model.

In one implementation, the computer system: sets a common width and length of voxels according to a resolution of the projection system; and sets a common height of voxels according to a vertical part resolution (versus print speed) selected by the user, according to a dimensional tolerance specified in the part model, or approaching a resolution limit of the additive manufacturing system, etc. For example, the computer system can prompt the user to set a slide between maximum print speed and tightest dimensional tolerance. In particular, if the user elects faster print speed (i.e., shorter print duration), the computer system can increase layer and voxel thickness for the part model. Similarly, if the user elects tighter dimensional tolerance, the computer system can decrease layer and voxel thickness, such as down to a minimum step height (e.g., a maximum vertical resolution) of the build tray of the additive manufacturing system.

The computer system can then generate a three-dimensional grid array of voxels according to these voxel dimensions and project this three-dimensional grid array of voxels onto the part model. In particular, each voxel defines a discrete subvolume of the part and includes a bottom surface that fully spans the field of view of one pixel in the projection system of the additive manufacturing system such that the projection can selectively irradiate this voxel during a build in order to selectively polymerize material within and just behind the voxel based on controlled exposure energy.

For example, in Blocks S130 and S140, the computer system can: segment the part model into a set of model layers of a common thickness, such as proportional to a part resolution or tolerance selected by the user; project fields of view of an array of pixels—in the projection system of the additive manufacturing system—onto the first model layer; define a first set of model volumes (e.g., "voxels") bounded by the common thickness of the first model layer and fields of view of the array of pixels projected onto the first model layer; and repeat this process for each other model layer of the part model to segment the part model into a three-dimensional array of discrete volumes.

9. Upward-facing Surface-level Voxel

Block S140 of the method S100 recites detecting a first superficial model volume, in the first set of model volumes of the first model layer, intersecting a first upward-facing surface of the part model. Generally, in Block S140, the computer system scans the part model for a set of surface-level voxels that contain upward-facing surfaces, as shown in FIG. 4.

For example, the computer system can: set an orientation of the part model within a virtual three-dimensional coordinate system; detect overhands in the part model; detect a first set of upward-facing exterior surfaces—on and around overhangs of the part model—that are parallel to a horizontal (e.g., an x-y) plane of the coordinate system; detect a second set of exterior surfaces of the part model that taper upwardly to face opposite the bottom plane; and detect a third set of exterior surfaces of the part model that taper downwardly to face the bottom plane. The computer system can then derive: a first frequency of surface-level voxels that contain (e.g., intersect) the first set of exterior surfaces; a second frequency of surface-level voxels that contain the second set of exterior surfaces; and a third frequency of surface-level voxels that contain the third set of exterior surfaces. The computer system can then iteratively adjust the position and/or orientation of the part model in the virtual three-dimensional coordinate system to: minimize the first frequency; maximize angles of the second set of exterior surfaces; and maximize the third frequency.

The computer system can then isolate the remaining surface-level voxels that contain tapered surfaces that face opposite the bottom plane of the coordinate system—that is "upward-facing surface-level voxels" (hereinafter "surface-level voxels"). For example, the computer system can identify—as a surface-level voxel—a voxel: partially but not fully contained in the virtual volume of the part model; and for which the cross-sectional area of the virtual volume of the part at the bottom of the voxel is greater than the cross-sectional area of the virtual volume of the part at the top of the voxel.

10. Hemispherical Polymerization Model

Figure 3A:
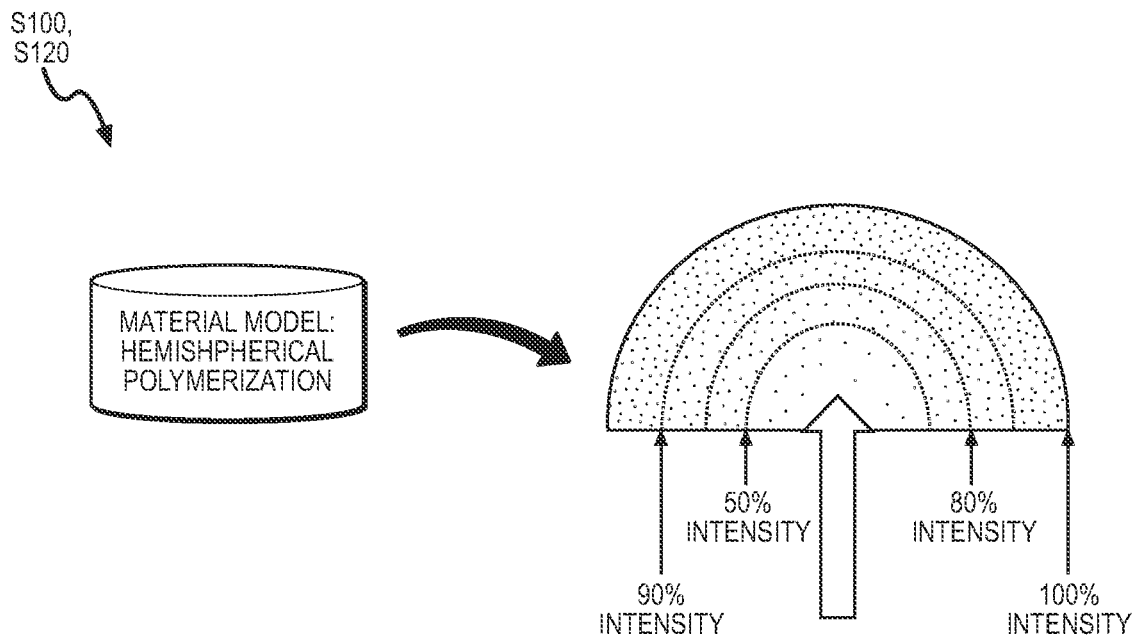
FIGS. 3A and 3B are graphical representations of variations of the method.

In one implementation shown in FIGS. 1 and 3A and described above, the computer system retrieves a material profile that predicts a hemispherical polymerization volume—characterized by a spherical radius proportional to exposure energy—for the material. In particular, the material profile can predict polymerization of the material that radiates outwardly from the center of the bottom of a voxel when the voxel is irradiated by a corresponding pixel in the projection system, wherein the radius of hemispherical polymerization is predicted by the working curve of the material and the irradiation energy incident on the voxel.

The computer system can then implement this hemispherical polymerization model to: set exposure energies for a second set of (i.e., one or more) interior voxels such that the surface of the predicted polymerization hemisphere—radiating from these interior voxels—approximates the surface contained in a surface-level voxel; and then repeat this process for each other surface-level voxel in the part model.

Furthermore, the computer system can: calculate or retrieve a maximum depth of penetration for the selected material, such as a depth corresponding to a horizontal asymptote of the working curve described above; and then calculates a maximum voxel offset distance equal to the maximum depth of penetration of the material. In particular, the maximum offset voxel distance approximates the maximum distance between a surface-level voxel and an interior voxel for which irradiation of the interior voxel is predicted to initiate polymerization of material within the surface-level voxel.

10.1 Hemispherical Polymerization Model: Ray to Interior Voxel Selection

In one implementation, the computer system then selects a first interior voxel on the same layer and inset from the surface-level voxel by a distance proportional to the angle of the surface in the surface-level voxel and that falls within the maximum voxel offset distance.

In one example, the computer system: calculates a centroid of the surface contained in the surface-level voxel; calculates a ray extending from the centroid of this surface within the surface-level voxel and facing into the virtual volume of the part; calculates a best-fit spherical radius of the surface contained in the surface-level voxel; sets a length of the ray to the best-fit spherical radius; and selects a first interior voxel fully contained within the part and for which its bottom center is nearest the inner end of the ray. The computer system can then: calculate a first minimum distance between the bottom center of the first interior voxel and the surface contained within the surface-level voxel; and calculates a first exposure energy for the first interior voxel based on the working curve and the first minimum distance.

In the foregoing example, the computer system can select a first interior voxel that is further from the surface-level voxel and contained in the same layer of the part as the surface-level voxel if the surface-level voxel contains a steeper, convex surface such that a lower segment of a polymerization hemisphere—representing a volume of material polymerized by irradiation of the first interior voxel with the first exposure energy—intersects the surface of the part contained within the surface-level voxel with minimal offset (or "error").

Similarly, the computer system can select a first interior voxel that is nearer the surface-level voxel and contained in the same layer of the part as the surface-level voxel if the surface-level voxel contains a convex surface near 45° (with a small effective radius) such that a mid-latitude segment of a polymerization hemisphere intersects the surface contained within the surface-level voxel with minimal offset (or "error").

Furthermore, the computer system can select a first interior voxel that is below the layer of the surface-level voxel if the surface-level voxel contains a shallow surface angle such that a top segment of a polymerization hemisphere intersects the surface contained within the surface-level voxel with minimal offset (or "error").

The computer system can then: assign the first exposure energy to the first interior voxel; repeat this process for all other surface-level voxels in all layers of the part; and write the resulting exposure energies of these interior voxels to pixels—representing these interior voxels—in a sequence of print images (e.g., tables, matrices) for the part.

In a similar example, the computer system can: detect a first superficial model volume (or "surface-level voxel")—in a first model layer of the part model—that intersects a first upward-facing surface defined in the part model; calculate a best-fit radius (e.g., spherical radius) of a first contour of the first upward-facing surface contained in the first surface-level model volume; and calculate a centroid of the first contour. In this example, the computer system can then calculate a ray: normal to the first contour proximal the centroid; and defining a nominal origin offset from the first contour by the best-fit radius. Accordingly, the computer system can select an interior model volume (e.g., a "interior voxel") fully contained within the first layer model and containing the nominal origin. Then, based on the material profile and a nominal (e.g., fixed) exposure duration per layer implemented by the additive manufacturing system, the computer system can then: calculate a first exposure intensity predicted to yield a first three-dimensional polymerization geometry that approximates the first contour when this exposure energy is projected onto the material for the nominal layer exposure duration by the additive manufacturing system during the build.

10.2 Spherical Error to Interior Voxel Selection

In another implementation, for a surface-level voxel, the computer system identifies a subset of interior voxels: fully contained within the virtual volume defined by the part model; that fall on the same or lower layer of the voxel grid projected onto the part model; and that define centroids within the maximum offset voxel distance of the centroid of the surface-level voxel (or within the maximum offset voxel distance of a centroid of the surface of the part contained within the voxel, or within the maximum offset voxel distance of the entire surface of the part contained within the voxel).

Then, for each interior voxel in this subset of interior voxels, the computer system calculates a radius of a polymerization hemisphere—radiating outwardly from the center of the bottom of the interior voxel—that falls fully within the virtual volume of the part and exhibits a minimum offset (or "error") from the surface contained within the surface-level voxel. The computer system then identifies a particular interior voxel associated with a polymerization hemisphere exhibiting minimal error in this subset of interior voxels. For example, the computer system can set an error threshold: inversely proportional to a tolerance selected by user; inversely proportional to a nominal tolerance associated with the material; and/or proportional to a print speed selected by the user. If this error calculated for the particular interior voxel is less than the threshold error, the computer system: sets an exposure energy of the surface-level voxel to null; calculates a target exposure energy (or radiation intensities over a period of time) for the particular interior voxel based on the working curve to achieve the radius of the corresponding polymerization hemisphere; and stores the target exposure energy (or radiation intensities over a period of time) in a pixel representing the particular voxel in a print image of the corresponding layer of the part.

Alternatively, in this implementation, if the error calculated for the particular interior voxel is greater than the threshold error, then the computer system can iteratively: select a combination of (e.g., two, three) interior voxels in the subset of interior voxels; combine the polymerization hemispheres—calculated for these interior voxels as described above—to derive a composite surface; and calculate a composite total error between the surface within the surface-level voxel and this composite surface. Furthermore, the computer system can iteratively repeat this process for increasing quantities of interior voxels until the total error between the surface within the surface-level voxel and the composite surface calculated for a combination of interior voxels—according to the hemispherical polymerization model—is less than the threshold error.

The computer system can then: set an exposure energy of the surface-level voxel to null; calculate a target exposure energy for each interior voxel based on the working curve of the material and the radius of their corresponding polymerization hemispheres; and store these target exposure energies in pixels representing these interior voxels in a sequence of print images of the part.

For example, to avoid over-exposure of the surface-level voxel within the part during a later build cycle, the computer system can: store a target exposure energy for one interior voxel in this set in each image—in a sequence of images—for each layer of the part around the surface-level voxel; and set a delay time between exposing the build window in the system to these images such that the surface-level voxel cools to a nominal operating temperature before exposure to a next image in this sequence in order to control depth of cure of material at the surface-level voxel. The computer system can similarly store one target exposure energy for each interior voxel in this set in each image—in a sequence of images—for the next layer of the part.

10.3 Sub-Surfaces

In another implementation, for a surface-level voxel, the computer system can set a surface-level sub-voxel area: inversely proportional to tolerance selected by the user; and proportional to print speed selected by the user. The computer system can then segment the surface contained within the surface-level voxel into a set of sub-surfaces: of area approximately (and less than) the surface-level sub-voxel area; and characterized by shortest total edge length.

The computer system can then execute the foregoing methods and techniques to select a set of (i.e., one or more) interior voxels and to calculate corresponding exposure energies for each sub-surface in the surface-level voxel.

10.4 Other Surface-Level Voxel Intersection Checks

In one variation, the computer system further verifies that an energy exposure thus calculated for an interior voxel—in order to achieve a polymerization boundary that approximates upward-facing surface in a nearby surface-level voxel—will not also polymerize material substantially beyond the surface of the part outside of this nearby surface-level voxel.

For example, the computer system can: estimate a polymerization volume resulting from irradiation of an interior voxel according to the target exposure energy calculated as described above; project the polymerization volume onto the virtual volume of the part defined in the part model; and characterize a disjoint volume of the polymerization volume located outside of the virtual volume of the part. Then, if the maximum thickness and/or total area of this disjoint volume exceed(s) a threshold(s), the computer system can reduce the target exposure energy assigned to the interior voxel or repeat the foregoing processes to select an alternate set of interior voxels and target exposure energies predicted to produce polymerization near the surface contained in the surface-level voxel with less polymerization beyond the surface of the part outside of this surface-level voxel.

10.5 Concurrent Interior Voxel Irradiation

In one variation, the computer system implements similar methods and techniques to select multiple (e.g., two) interior voxels in the same layer of the part for modified irradiation—such as in parallel in one image or in series over multiple images—in order to polymerize a volume of material that extends into the surface-level voxel to approximate the profile of the surface within the surface-level voxel. In particular, the computer system can retrieve a polymerization model that predicts polymerization depth (in three dimensions) resulting from irradiation of multiple discrete surfaces of the material (e.g., the bottoms of two or more interior voxels).

The computer system can then implement the polymerization model and methods described above to select and refine two or more interior voxels predicted to yield a composite polymerization volume that extends into the surface-level voxel and approximates the profile of the surface contained in the surface-level voxel when these interior voxels are concurrently irradiated with particular exposure energies. The computer system can then write these exposure energies to representations of these interior voxels in one image corresponding to this layer of the part.

Additionally or alternatively, the computer system can then implement methods described above to select and refine two or more interior voxels—in the same or different layers of the part—predicted to yield a combined polymerization volume that extends into the surface-level voxel and approximates the profile of the surface contained in the surface-level voxel when these interior voxels are irradiated—in series and with sufficient delay time therebetween—according to particular exposure energies. The computer system can then write these exposure energies to representations of these interior voxels in a series of images corresponding to this layer (or these layers) of the part.

10.6 Error Modes

In one variation, the computer system characterizes both textural error and dimensional error between the surface defined in the surface-level voxel and the polymerization volume of the first set of interior voxels at their prescribed exposure energies.

For example, the computer system can characterize textural error as polymerization volume resulting from irradiation of the first set of interior voxels at their prescribed exposure energies. In particular, if the slope (e.g., steepness) and profile (e.g., curvature) of the polymerization volume deviates from the surface defined in the surface-level voxel, the resulting texture at the surface of the final part in the location of this surface-level voxel may differ from the surrounding surface of the part, and the part may therefore exhibit inconsistent texture. Therefore, the computer system can iteratively repeat the foregoing processes to select one or more interior voxels and to set exposure energies for these interior voxels in order to reduce differences between the slope and profile of the surface defined in the surface-level voxel and the slope and profile of the polymerization volume prescribed by these interior voxels in order to achieve more consistent, predictable texture on the surface of a final part.

Similarly, the computer system can characterize dimensional error as a total (e.g., absolute) volume between the surface defined in the surface-level voxel and the polymerization volume resulting from irradiation of the first set of interior voxels at their prescribed exposure energies. In particular, a large total volume between the surface of the polymerization volume and the surface defined in the surface-level voxel may predict low dimensional accuracy of the final part in the region of this surface-level voxel. Therefore, the computer system can iteratively repeat the foregoing processes to select one or more interior voxels and to set exposure energies for these interior voxels in order to reduce the total volume between the surface defined in the surface-level voxel and the polymerization volume prescribed by these interior voxels in order to achieve greater dimensional accuracy of a final part.

Thus, if a surface sector of the part model containing a surface-level voxel is annotated with a tight tolerance, the computer system can implement the foregoing process to iteratively refine selection of a set of interior voxels and their exposure energies in order to reduce the total volume between the surface defined in the surface-level voxel and the polymerization volume prescribed by these interior voxels. Similarly, if a surface sector of the part model containing a surface-level voxel is annotated with a looser tolerance and a prescribed texture, the computer system can implement the foregoing process to iteratively refine selection of a set of interior voxels and their exposure energies in order to preferentially reduce slope and profile differences between the total volume between the surface defined in the surface-level voxel and surface of the polymerization volume prescribed by these interior voxels.

11. Interior Model Volume Selection by Concave/Convex Surface+Slope

In one implementation described above and shown in FIG. 4, the computer system: segments the part model into a three-dimensional array of model volumes (e.g., voxels) in Block S130; selects a surface-level model volume in the array; and characterizes a slope of a section of a surface of the part model contained in the surface-level model volume in Block S140. For example, the computer system can calculate: a minimum angle between a horizontal x-y plane through the surface-level model volume and a tangent ray located on the surface section; an average angle between the bottom plane of surface-level model volume and the surface section at the intersection of the bottom plane of the surface-level model volume and the surface section; or an angle between the horizontal x-y plane through the surface-level model volume and a tangent ray located on a centroid of the surface section; etc. The computer system can then store this angle as the "slope" of the section of the surface of the part model contained in the virtual model volume.

In this implementation, the computer system can also characterize the surface section as either (predominantly) convex or concave. For example, the computer system can: implement methods and techniques described above to calculate a best-fit (spherical) radius of the surface section; and calculate a position of a sphere—of radius equal to the best-fit radius—that minimizes error between the surface of the sphere and the surface section. The computer system can then: characterize the surface section as convex if the origin of the sphere falls inside of the part model; and characterize the surface section as concave if the origin of the sphere falls outside of the part model.

The computer system can then select a single interior model volume (or a small quantity of interior model volumes) on the same layer as the surface-level model volume for increased energy exposure—and therefore extended polymerization to approximate the surface section—if the surface section exhibits a steep slope (e.g., greater than 45°) and is convex.

Alternatively, the computer system can select multiple interior model volumes (or a greater quantity of interior model volumes) on the same layer as the surface-level model volume for increased energy exposure if the surface section exhibits a steep slope and is concave.

Yet alternatively, the computer system can select a single interior model volume (or a small quantity of interior model volumes) on the succeeding model layer for increased energy exposure if the surface section exhibits a shallow slope (e.g., less than 45°) and is convex.

Yet alternatively, the computer system can select multiple interior model volumes (or a greater quantity of interior model volumes) on the succeeding model layer for increased energy exposure if the surface section exhibits a shallow slope and is concave.

Therefore, the computer system can select interior model volumes—including a single interior model volume or groups of interior model volumes on the same or subsequent layer as the surface-level model volume—based on the slope and contour of the surface section contained in the surface-level model volume.

11.1 Steep Convex Surface Contour

In one implementation shown in FIG. 4, the computer system implements methods and techniques described above to characterize an upward-facing surface—contained in a surface-level model volume—as convex with an effective tangent inclined from a horizontal plane by greater than a threshold angle, such as: a threshold angle of 45° for a material model that predicts hemispherical polymerization; or a threshold angle of 60° for a material model that predicts semi-ellipsoidal polymerization with slower rate of vertical polymerization than horizontal polymerization. Accordingly, the computer system selects a set of interior model volumes—in the same model layer as the surface-level model volume—proximal the surface-level model volume, such as: a first group of three interior model volumes nearest and immediately adjacent the surface-level model volume; and five interior model volumes offset from the surface-level model volume by the first group of interior model volumes.

Then, for each interior model volume in this set of interior model volumes, the computer system: calculates an exposure energy predicted—by the material profile—to yield a three-dimensional polymerization geometry intersecting the upward-facing surface contained within the surface-level model volume when this energy is projected onto a corresponding volume of the material during a build; and calculates an error between this three-dimensional polymerization geometry and the upward-facing surface contained within the surface-level model volume. The computer system then selects a particular interior model volume—from the set of interior model volumes—associated with a lowest error in this set.

Alternatively, in this implementation, the computer system can define combinations of interior model volumes in this set of interior model volumes in the same model layer as the surface-level volume, such as combinations of one, two, three, and four interior model volumes in this set of interior model volumes. Then, for each combination of interior model volumes, the computer system: defines a composite interior model volume containing the interior model volumes in the combination; and calculates a single exposure energy predicted to yield a three-dimensional polymerization geometry that approximates (e.g., exhibits a minimum error or offset from) the upward-facing surface contained within the surface-level model volume when this exposure energy is projected onto a volume of the material corresponding to this composite interior model volume during the build. The computer system then selects a particular combination of interior model volumes—from this set of combinations—that predicts a three-dimensional polymerization geometry characterized by a lowest error (e.g., an offset) from the upward-facing surface contained in the surface-level model volume. The computer system then writes the exposure energy calculated for the particular combination to a set of pixels—corresponding to the interior model volumes in this combination—in the print image for this model layer.

11.2 Steep Concave Surface Contour

In another implementation shown in FIG. 4, the computer system implements methods and techniques described above: to characterize an upward-facing surface—contained in a surface-level model volume—as concave with an effective tangent inclined from a horizontal plane by greater than the threshold angle; and to calculate a best-fit radius of the upward-facing surface.

Accordingly, the computer system selects a set of interior model volumes—in the same model layer as the surface-level model volume—proximal the surface-level model volume, such as: a single interior model volume nearest the surface-level model volume if the best-fit radius of the upward-facing surface is very large; two interior model volumes nearest the surface-level model volume if the best-fit radius of the upward-facing surface is large; three interior model volumes nearest the surface-level model volume if the best-fit radius of the upward-facing surface is moderate; and four interior model volumes nearest the surface-level model volume if the best-fit radius of the upward-facing surface is small.

For each interior model volume in this set, the computer system then calculates an exposure energy predicted to yield a first three-dimensional polymerization geometry that intersects the upward-facing surface contained within the surface-level model volume when this exposure energy is projected onto a volume of the material corresponding to the interior model volume during a build.

For example, if the best-fit radius of the upward-facing surface contained in the surface-level model volume is large, the computer system can select two interior model volumes nearest the surface-level model volume. For the first interior model volume in this set, the computer system can: calculate a first exposure energy predicted to yield a first three-dimensional polymerization geometry intersecting the upward-facing surface contained within the surface-level model volume when this exposure energy is projected onto a first volume of the material corresponding to this first interior model volume during the build; and write this first exposure energy to a corresponding pixel in a print image for this model layer. Similarly, for the second interior model volume in this set, the computer system can: calculate a second exposure energy predicted to yield a second three-dimensional polymerization geometry intersecting the upward-facing surface contained within the surface-level model volume when this exposure energy is projected onto a second volume of the material corresponding to this second interior model volume during the build; and write this second exposure energy to a corresponding pixel in the print image for this model layer.

Alternatively, as shown in FIG. 4, the computer system can: define a composite interior model volume containing the first and second interior model volumes; calculate a single exposure energy predicted to yield a three-dimensional polymerization geometry that approximates (e.g., exhibits a minimum error or offset from) the upward-facing surface contained within the surface-level model volume when this exposure energy is projected onto a volume of the material corresponding to this composite interior model volume during the build; and write this exposure energy to pixels corresponding to the first and second interior model volumes in the print image for this model layer.

In a similar implementation, the computer system can define combinations of interior model volumes in the same model layer as the surface-level volume, such as combinations of one, two, three, and four interior model volumes within one, two, and three voxel widths of the surface-level volume. Then, for each combination of interior model volumes, the computer system: defines a composite interior model volume containing the interior model volumes in the combination; and calculates a single exposure energy predicted to yield a three-dimensional polymerization geometry that approximates (e.g., exhibits a minimum error or offset from) the upward-facing surface contained within the surface-level model volume when this exposure energy is projected onto a volume of the material corresponding to this composite interior model volume during the build. The computer system then selects a particular combination of interior model volumes—from this set of combinations—that predicts a three-dimensional polymerization geometry characterized by a lowest error (e.g., an offset) from the upward-facing surface contained in the surface-level model volume. The computer system then writes the exposure energy calculated for the particular combination to a set of pixels—corresponding to the interior model volumes in this combination—in the print image for this model layer.

11.3 Shallow Convex Surface Contour

In another implementation shown in FIG. 4, the computer system implements methods and techniques described above to characterize an upward-facing surface—contained in a surface-level model volume—as convex with an effective tangent inclined from a horizontal plane by less than the threshold angle.

Accordingly, the computer system selects a set of interior model volumes—in a second, subsequent model layer below the surface-level model volume—proximal the surface-level model volume, such as: a first interior model volume immediately below the surface-level model volume; and eight interior model volumes in the second layer and encompassing the first interior model volume.

Then, for each interior model volume in this set of interior model volumes, the computer system calculates: an exposure energy predicted—by the material profile—to yield a three-dimensional polymerization geometry intersecting the upward-facing surface contained within the surface-level model volume when this energy is projected onto a corresponding volume of the material during a build; and an error between this three-dimensional polymerization geometry and the upward-facing surface contained within the surface-level model volume. The computer system then selects a particular interior model volume—from the set of interior model volumes—associated with a lowest error in this set.

Alternatively, as shown in FIG. 4, the computer system can define combinations of interior model volumes in this set of interior model volumes in the second layer below the surface-level model volume, such as combinations of one, two, three, and four interior model volumes in this set of interior model volumes. Then, for each combination of interior model volumes, the computer system: defines a composite interior model volume containing the interior model volumes in the combination; and calculates a single exposure energy predicted to yield a three-dimensional polymerization geometry that approximates (e.g., exhibits a minimum error or offset from) the upward-facing surface contained within the surface-level model volume when this exposure energy is projected onto a volume of the material corresponding to this composite interior model volume during the build. The computer system then selects a particular combination of interior model volumes—from this set of combinations—that predicts a three-dimensional polymerization geometry characterized by a lowest error (e.g., an offset) from the upward-facing surface contained in the surface-level model volume. The computer system then writes the exposure energy calculated for the particular combination to a set of pixels—corresponding to the interior model volumes in this combination—in the print image for this model layer.

In the foregoing implementations, the computer system can select interior model volumes contained only in the second model layer immediately below the first model layer of the surface-level model volume and implement the foregoing methods and techniques to calculate new exposure energies for a subset of these interior model volumes predicted to yield a three-dimensional polymerization volume that approximates the upward-facing surface contained in the surface-level model volume. Alternatively, the computer system can select interior model volumes in multiple layers below the surface-level model volume and then implement the foregoing methods and techniques to calculate new exposure energies for a subset of these interior model volumes. For example, the computer system can: characterize a slope of the upward-facing surface contained in the surface-level model volume; select a second model layer located below the surface-level model volume by a distance inversely proportional to the slope; select a set of interior model volumes from the second model layer; and then implement the foregoing methods and techniques to calculate new exposure energies for a subset of these interior model volumes in this second layer. Therefore, in this example, the computer system can: selectively increase a first exposure energy for a first interior model volume on the same layer as and adjacent a surface-level model volume if the upward-facing surface contained in the surface-level model volume is steep; and selectively increase a second exposure energy for a second interior model volume on a second layer immediately below the surface-level model volume if the upward-facing surface contained in the surface-level model volume is moderately steep; and selectively increase a third exposure energy for a third interior model volume on a third layer two layers below the surface-level model volume if the upward-facing surface contained in the surface-level model volume is shallow.

11.4 Shallow Concave Surface Contour

In another implementation shown in FIG. 4, the computer system implements methods and techniques described above to characterize an upward-facing surface—contained in a surface-level model volume—as concave with an effective tangent inclined from a horizontal plane by less than the threshold angle.

Accordingly, the computer system selects a set of interior model volumes—in a second, subsequent model layer below the surface-level model volume—proximal the surface-level model volume, such as: a first interior model volume immediately below the surface-level model volume; and eight interior model volumes in the second layer and encompassing the first interior model volume.

Then, for each interior model volume in this set of interior model volumes, the computer system: calculates an exposure energy predicted—by the material profile—to yield a three-dimensional polymerization geometry intersecting the upward-facing surface contained within the surface-level model volume when this energy is projected onto a corresponding volume of the material during a build; and calculates an error between this three-dimensional polymerization geometry and the upward-facing surface contained within the surface-level model volume. The computer system then selects a particular interior model volume—from the set of interior model volumes—associated with a lowest error in this set.

Alternatively, as shown in FIG. 4, the computer system can define combinations of interior model volumes in this set of interior model volumes in the second layer below the surface-level model volume, such as combinations of one, two, three, and four interior model volumes in this set of interior model volumes. Then, for each combination of interior model volumes, the computer system: defines a composite interior model volume containing the interior model volumes in the combination; and calculates a single exposure energy predicted to yield a three-dimensional polymerization geometry that approximates (e.g., exhibits a minimum error or offset from) the upward-facing surface contained within the surface-level model volume when this exposure energy is projected onto a volume of the material corresponding to this composite interior model volume during the build. The computer system then selects a particular combination of interior model volumes—from this set of combinations—that predicts a three-dimensional polymerization geometry characterized by a lowest error (e.g., an offset) from the upward-facing surface contained in the surface-level model volume. The computer system then writes the exposure energy calculated for the particular combination to a set of pixels—corresponding to the interior model volumes in this combination—in the print image for this model layer.

In another implementation, if a best-fit radius of the upward-facing surface contained in the surface-level model volume is large, the computer system can: select a single interior model volume below the surface-level model volume and nearest a centroid of the upward-facing surface contained in the surface-level model volume; and implement the foregoing methods and techniques to calculate an exposure energy predicted—by the material profile—to yield a three-dimensional polymerization geometry that intersects the upward-facing surface contained within the surface-level model volume when this energy is projected onto a corresponding volume of the material during a build. Alternatively, if the best-fit radius of the upward-facing surface contained in the surface-level model volume is moderate, the computer system can select two interior model volumes below the surface-level model volume and nearest the centroid of the upward-facing surface contained in the surface-level model volume. For the first interior model volume in this set, the computer system can: calculate a first exposure energy predicted to yield a first three-dimensional polymerization geometry intersecting the upward-facing surface contained within the surface-level model volume when this exposure energy is projected onto a first volume of the material corresponding to this first interior model volume during the build; and write this first exposure energy to a corresponding pixel in a print image for this model layer. Similarly, the second interior model volume in this set, the computer system can: calculate a second exposure energy predicted to yield a second three-dimensional polymerization geometry intersecting the upward-facing surface contained within the surface-level model volume when this exposure energy is projected onto a second volume of the material corresponding to this second interior model volume during the build; and write this second exposure energy to a corresponding pixel in the print image for this model layer. Yet alternatively, if the best-fit radius of the upward-facing surface contained in the surface-level model volume is large, the computer system can: select three interior model volumes below the surface-level model volume and nearest the centroid of the upward-facing surface contained in the surface-level model volume; and implement the foregoing methods and techniques to calculate exposure energies for these interior model volumes.

12. Non-Spherical Polymerization Model

In the foregoing implementations, the computer system can implement the material model to predict hemispherical polymerization: that extends upwardly and outwardly from a center of a volume of the material when irradiated with a target exposure energy by the additive manufacturing system; and that is characterized by a spherical radius proportional to this target exposure energy.

Alternatively, the computer system can implement methods and techniques similar to those described above based on a material model that predicts a three-dimensional squircle polymerization geometry, such as a smoothed three-dimensional composition (e.g., union) of many polymerization hemispheres, each centered on a distinct subarea on the bottom of a voxel and characterized by a spherical radius based on the working curve for the material, a total exposure energy of the voxel, and the proportion of the total exposure energy of the voxel that intersects the distinct subarea when irradiated. (Alternatively, the computer system can derive this material model based on coaxial and perpendicular working curves for the material and a known geometry of a voxel.)

For example, the computer system can implement the material model that predicts hemispherical polymerization or three-dimensional squircle polymerization geometry based on selection of a material with high internal reflection and/or high polymerization sensitivity where irradiation of the bottom of a voxel of the material in a vertical direction results in both vertical polymerization through the height of the voxel and lateral polymerization outwardly from the voxel at similar rates.

12.1 Non-Spherical Polymerization Model: Pyramidal Polymerization Volume

However, another material with lower internal reflection, exhibiting less attenuation of light passing therethrough, and/or exhibiting lower polymerization sensitivity may exhibit a greater rate of polymerization parallel to the direction of irradiation (i.e., normal to layers of a part printed with the material in the system, parallel to light rays incident on the material from the projection system) than polymerization moving laterally outward from an irradiated area of the material.

For example, when a voxel of this material—in a layer of a part printed in the system—is irradiated, a volume of the material may polymerize around this voxel according to a geometry: defining a base that approximates the geometry of the irradiated bottom of the voxel; tapering upwardly and narrowing from the base at an angle inversely proportional to the internal reflection of the material; and scaled according to the exposure energy. Therefore, a material exhibiting less internal reflection may yield a taller, steeper polymerization volume than a material with greater internal reflection given similar exposure energy over a similar voxel area. Accordingly, the computer system can retrieve a material model that predicts a pyramidal polymerization geometry, wherein the height of a polymerization pyramid is a function of exposure energy and wherein steepness of the polymerization pyramid is a function of internal reflection and/or polymerization sensitivity of the material. (Alternatively, the computer system can derive this material model based on coaxial and perpendicular working curves for the material and a known geometry of a voxel.)

12.2 Non-Spherical Polymerization Model: Conical Polymerization Volume

In another example, the computer system can implement a material model that predicts a polymerization volume prescribed by a smoothed three-dimensional composition (e.g., union, a sum forming a convex hull) of many polymerization cones, each: centered on a distinct subarea on the bottom of a voxel; characterized by a radius at the bottom of the voxel based on a perpendicular working curve for the material (or lateral polymerization width as a function of axial exposure energy), a total exposure energy of the voxel, and the proportion of the total exposure energy of the voxel that intersects the distinct subarea when irradiated; and characterized by a total height above the bottom of the voxel based on a coaxial working curve for the material (or vertical polymerization depth as a function of axial exposure energy), a total exposure energy of the voxel, and the proportion of the total exposure energy of the voxel that intersects the distinct subarea when irradiated. (Alternatively, the computer system can derive this material model based on coaxial and perpendicular working curves for the material and a known geometry of a voxel.)

Figure 3B:
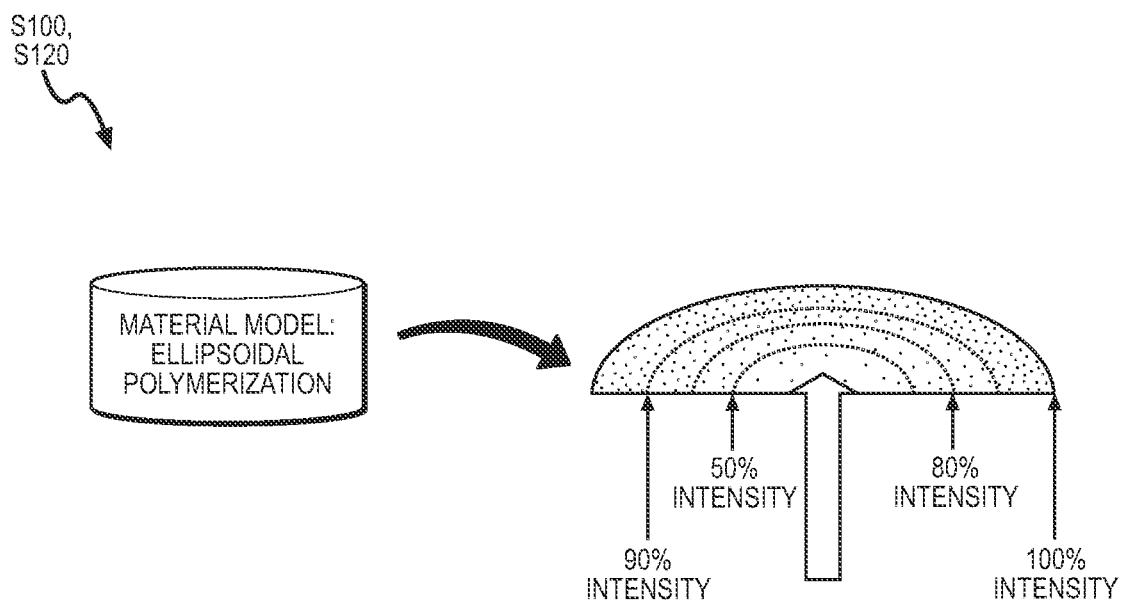

12.3 Non-Spherical Polymerization Model: Semi-Ellipsoidal Polymerization Volume Yet alternatively and as shown in FIG. 3B, the computer system can implement methods and techniques similar to those described above based on a material model that predicts a three-dimensional semi-ellipsoidal polymerization geometry with a base of the semi-ellipsoidal polymerization geometry coincident a bottom horizontal plane of a layer of a part. For example, the material profile can define: horizontal polymerization at a first rate proportional to exposure energy within a volume of the material; and vertical polymerization at a second rate—less than the first rate—proportional to exposure energy within the volume of the material.

12.4 Non-Spherical Polymerization Model: Interior Voxel Selection and Exposure Energy In these variations, the computer system can then implement methods and techniques described above to: isolate a surface-level voxel that intersects a surface of the virtual volume defined in the part model; and identify a set of interior voxels—in the same or lower layer of the part—for which a target exposure energy is predicted to a) (fully) polymerize material within these interior voxels and b) polymerize material up to an edge that approximates the surface contained in the surface-level voxel based on the material model (or based on coaxial and perpendicular working curves for the material and a known geometry of the surface-level voxel).

13. Print Images+Print File

Blocks S154 and S160 of the method S100 recite: populating a first print image with the first exposure energy in a first image area corresponding to the first model volume in the first model layer in Block S154; and storing the first print image in a print file for the part in Block S160. Generally, in Block S154 and S160, the computer system can: generate a sequence of print images containing exposure energies (e.g., irradiation intensity and exposure timing data) for interior voxels and select surface-level voxels; and aggregate these print images into a print file for the part, as shown in FIGS. 1, 2, and 4

In one implementation, upon ingest of the part model, the computer system: segments the part model into model layers and discrete volumes in Blocks S130 and S132; and isolate a subset of interior model volumes—across all model layers of the part model—that are fully contained within the part model. Based on the material profile, the computer system calculates a nominal exposure energy predicted to polymerize a volume of the material contained in an interior model volume, to achieve a minimal green strength of material within the interior model volume, and to fully (or sufficiently) bond material within the interior model volume to polymerized material in adjacent interior model volumes on the same and preceding layers of the part.

Then, for each model layer in the part model, the computer system: implements methods and techniques described above to update energy exposures—greater than the nominal energy exposure—for a target subset of interior model volumes adjacent a target subset of surface-level model volumes containing upward-facing surfaces in the part model; initializes a print image for the model layer; populates image areas (e.g., pixels) corresponding to the target subset of interior model volumes with updated exposure energies of these interior model volumes; populates the first print image with null exposure energies in image areas corresponding to the target subset of surface-level model volumes containing upward-facing surfaces; and writes the nominal energy exposure to image areas corresponding to each other interior model volume in the model layer. The computer system then aggregates this print image into a print file executable by the additive manufacturing system to manufacture an instance of the part.

14. Variable Model Volumes

In one variation shown in FIG. 2, the computer system implements the foregoing methods and techniques to calculate an energy exposure for a model volume—adjacent or intersecting an upward-facing surface in the part model—corresponding to a cluster of pixels in a print image rather than for a voxel corresponding to an individual pixel in this print image. More specifically, in this variation, the computer system can implement the foregoing methods and techniques to calculate energy exposures for larger model volumes adjacent or intersecting upward-facing surfaces within the part model.

In one example, the computer system: projects fields of view of an array of pixels, in the projection system of the additive manufacturing system, onto a first model layer of the part model in Block S132; selects a superficial model volume containing fields of view of a first cluster of (e.g., two, ten) pixels—in the array of pixels of the projection system projected onto the first model layer—intersecting an upward-facing surface of the part model in Block S140; selects an interior model volume bounded by fields of view of a second cluster of (e.g., two, twenty) pixels adjacent the superficial model volume in Block S150; and implements methods and techniques described above to calculate an exposure energy that, when cooperatively projected onto a layer of the material by the second cluster of pixels of the projection system during a build, polymerizes a volume of the material that approximates the upward-facing surface. The computer system can then write this energy exposure to pixels—corresponding to the second cluster of pixels of the projection system—in a print image for this model layer of the part model.

15. Print Process

The computer system can then serve the print file to the additive manufacturing system for execution of the build to form the part. In particular, the computer system can upload the print file to the additive manufacturing system, which can then implement methods and techniques described in U.S. patent application Ser. No. 16/672,410 to selectively irradiate sequential layers of the material—arranged across a build window—according to print images contained in the print file.

For example, the additive manufacturing system can implement methods and techniques described in U.S. patent application Ser. No. 16/672,410 to: load a first layer of the material into a first interstitial volume over a build window (e.g., between the build window and a previous layer of the part or between the build window and a build platform of the additive manufacturing system); load a first print image corresponding to a first model layer of the part model on the projection system; and project the first print image onto the first volume of the material. The additive manufacturing system can thus: selectively expose each subvolume of the material—corresponding to an interior region of the first model layer in the part model—to a nominal energy predicted to achieve a minimum green strength within the subvolume and minimum cross linking to adjacent polymerized subvolumes in the first layer of the material; and selectively expose perimeter subvolumes of the material—corresponding to interior model volumes adjacent upward-facing surfaces in the first layer of the part model—to increased energies predicted to yield three-dimensional polymerization geometries that approximate contours of these upward-facing surfaces.

16. Temperature-based Print Process

In one variation, the additive manufacturing system includes a thermal sensor (e.g., an infrared camera) configured to track temperatures across the build window during a build cycle.

In this variation, the computer system can access a material profile that links material temperature or temperature gradient during and/or after irradiation to polymerization or polymerization gradient. Accordingly, in this variation, the computer system can implement methods and techniques similar to those described above: to set target temperatures within surface-level and interior voxels—rather than target radiation intensities of these voxels—predicted to yield partial polymerization within surface-level voxels that approximates the surfaces defined in these surface-level voxels; and to store these target temperatures in target temperature images of each layer of the part model. The additive manufacturing system then: tracks temperatures across layers of a part during a build cycle via the thermal sensor; and implements closed-loop controls to selectively irradiate each layer of the part in order to minimize differences between actual and target temperatures across these layers of the part during the build cycle.

The additive manufacturing systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
   accessing a part model comprising a three-dimensional representation of a part;
   accessing a material profile of a material selected for the part, the material profile relating exposure energy and three-dimensional polymerization geometry of the material;
   segmenting the part model into a set of model layers;
   segmenting a first model layer, in the set of model layers, into a first set of model volumes;
   detecting a first superficial model volume, in the first set of model volumes of the first model layer, intersecting a first upward-facing surface of the part model;
   selecting a first interior model volume, in the first set of model volumes of the first model layer, fully contained within the part model;
   based on the material profile, calculating a first exposure energy predicted to yield a first three-dimensional polymerization geometry approximating a first contour of the first upward-facing surface contained within the first superficial model volume when projected onto the material during a build;
   populating a first print image with the first exposure energy in a first image area corresponding to the first interior model volume in the first model layer; and
   storing the first print image in a print file for the part.

2. The method of claim 1, further comprising populating the first print image with a null exposure energy in a second image area corresponding to the first superficial model volume in the first model layer.

3. The method of claim 1:
   further comprising:
      isolating a subset of interior model volumes, in the set of model layers, fully contained within the part model;
      based on the material profile, setting a nominal exposure energy predicted to polymerize a volume of the material corresponding to an interior model volume of part model; and
      populating print images, in the print file, with the nominal exposure energy in image areas corresponding to the subset of interior model volumes; and
   wherein calculating the first exposure energy comprises calculating the first exposure energy, greater than the nominal exposure energy, predicted to polymerize the material in a part volume:
      corresponding to the first interior model volume; and
      extending laterally into the first superficial model volume toward the first contour.

4. The method of claim 1:
   wherein segmenting the part model into the set of model layers comprises segmenting the part model into the set of model layers of a common thickness;
   wherein segmenting the first model layer into the first set of model volumes comprises:
      projecting fields of view of an array of pixels, in a projection system of an additive manufacturing system, onto the first model layer; and
      defining the first set of model volumes bounded by:
         the common thickness of the first model layer; and
         fields of view of the array of pixels projected onto the first model layer; and
   further comprising serving the print file to the additive manufacturing system for execution of the build to form the part.

5. The method of claim 1:
   wherein segmenting the first model layer into the first set of model volumes and selecting the first superficial model volume comprises:
      projecting fields of view of an array of pixels, in a projection system of an additive manufacturing system, onto the first model layer; and
      selecting the first superficial model volume containing fields of view of a first cluster of pixels, in the array of pixels of the projection system projected onto the first model layer, intersecting the first upward-facing surface of the part model;
   wherein selecting the first interior model volume comprises:
      selecting the first interior model volume bounded by fields of view of a second cluster of pixels, in the array of pixels, adjacent the first superficial model volume; and
   wherein calculating the first exposure energy comprises calculating the first exposure energy cooperatively projected by the second cluster of pixels, of the projection system, onto the material during the build.

6. The method of claim 1, further comprising:
serving the print file to an additive manufacturing system; and
by the additive manufacturing system:
loading a first layer of the material into a first interstitial volume over a build window; and
exposing a first subvolume of the material, in the first layer of the material, with the first exposure energy according to the first print image in the print file to selectively polymerize a second subvolume of the material adjacent the first subvolume of the material to approximate the first contour of the first upward-facing surface.

7. The method of claim 1, wherein selecting the first interior model volume comprises:
calculating a best-fit radius of the first contour;
calculating a centroid of the first contour;
calculating a ray:
normal to the first contour proximal the centroid; and
defining a nominal origin offset from the first contour by the best-fit radius; and
selecting the first interior model volume fully contained within the first model layer and containing the nominal origin.

8. The method of claim 1, wherein calculating the first exposure energy comprises:
based on the material profile and a nominal layer exposure duration implemented by an additive manufacturing system, calculating a first exposure intensity predicted to yield the first three-dimensional polymerization geometry approximating the first contour when projected onto the material for the nominal layer exposure duration by the additive manufacturing system during the build.

9. The method of claim 1:
wherein accessing the material profile comprises accessing the material profile that predicts:
horizontal polymerization of the material at a first rate proportional to exposure energy; and
vertical polymerization of the material at a second rate, less than the first rate, proportional to exposure energy; and
wherein selecting the first interior model volume comprises:
characterizing a slope of the first contour of the first upward-facing surface; and
selecting the first interior model volume inset from the first superficial model volume by a distance proportional to the slope of the first contour of the first upward-facing surface.

10. The method of claim 1, wherein selecting the first interior model volume comprises:
based on the first upward-facing surface defining a convex profile characterized by an effective tangent inclined from a horizontal plane, parallel to the first model layer, by greater than a threshold angle:
selecting a first set of interior model volumes, in the first model layer, proximal the first superficial model volume;
for each interior model volume in the first set of interior model volumes:
based on the material profile, calculating an exposure energy predicted to yield a three-dimensional polymerization geometry intersecting the first upward-facing surface contained within the first superficial model volume when projected onto the material during the build; and
calculating an error, in a first set of errors, between the three-dimensional polymerization geometry and the first upward-facing surface contained within the first superficial model volume; and
selecting the first interior model volume, from the first set of interior model volumes, associated with a lowest error in the first set of errors.

11. The method of claim 10, wherein:
accessing the material profile comprises accessing the material profile that predicts a hemispherical polymerization volume, characterized by a spherical radius proportional to exposure energy, for the material; and
selecting the first superficial model volume comprises selecting the first superficial model volume defining the convex profile characterized by the effective tangent inclined from the horizontal plane by greater than the threshold angle of 45 degrees.

12. The method of claim 1:
wherein selecting the first interior model volume comprises, based on the first upward-facing surface defining a convex profile characterized by an effective tangent inclined from a horizontal plane, parallel to the first model layer, by greater than a threshold angle:
selecting the first interior model volume proximal the first superficial model volume and fully contained within the first model layer of the part model; and
further comprising:
segmenting a second model layer, in the set of model layers, into a second set of model volumes;
segmenting a third model layer, in the set of model layers, into a third set of model volumes, the third layer adjacent and above the second model layer in the part model;
detecting a second superficial model volume, in the third set of model volumes of the third layer intersecting a second upward-facing surface of the part model, the second upward-facing surface defining a second convex profile characterized by a second effective tangent inclined from the horizontal plane by less than the threshold angle;
selecting a second interior model volume, in the second set of model volumes:
defined below the second superficial model volume of the third model layer; and
fully contained within the second model layer of the part model;
based on the material profile, calculating a second exposure energy predicted to yield a second three-dimensional polymerization geometry approximating a second contour of the second upward-facing surface contained within the second superficial model volume when projected onto the material during the build;
populating a second print image with the second exposure energy in a second image area corresponding to the second interior model volume in the second model layer; and
storing the second print image in the print file.

13. The method of claim 1:
wherein selecting the first interior model volume comprises:
based on the first superficial model volume intersecting the first upward-facing surface defining a concave profile characterized by an effective tangent inclined from a horizontal plane, parallel to the first model layer, by greater than a threshold angle:
  selecting the first interior model volume, in the first model layer, adjacent the first superficial model volume; and
  selecting a second interior model volume, in the first model layer, adjacent the first superficial model volume;
wherein calculating the first exposure energy comprises:
  based on the material profile, calculating the first exposure energy predicted to yield the first three-dimensional polymerization geometry intersecting the first upward-facing surface contained within the first superficial model volume when projected onto the material during the build;
further comprising:
  based on the material profile, calculating a second exposure energy predicted to yield a second three-dimensional polymerization geometry intersecting the first upward-facing surface contained within the first superficial model volume when projected onto the material during the build, the first three-dimensional polymerization geometry and the second three-dimensional polymerization geometry cooperating to approximate the first contour of the first upward-facing surface contained within the first superficial model volume; and
  populating the first print image with the second exposure energy in a second image area corresponding to the second interior model volume in the first model layer.

14. The method of claim 1:
wherein selecting the first interior model volume comprises, based on the first upward-facing surface characterized by an effective tangent inclined from a horizontal plane, parallel to the first model layer, by greater than a threshold angle:
  selecting the first interior model volume proximal the first superficial model volume and fully contained within the first model layer of the part model; and
further comprising:
  segmenting a second model layer, in the set of model layers, into a second set of model volumes;
  segmenting a third model layer, in the set of model layers, into a third set of model volumes, the third layer adjacent and above the second model layer in the part model;
  detecting a second superficial model volume, in the third set of model volumes of the third layer intersecting a second upward-facing surface of the part model, the second upward-facing surface defining a concave contour characterized by a second effective tangent inclined from the horizontal plane by less than the threshold angle;
  selecting a second interior model volume, in the second set of model volumes:
    defined below the second superficial model volume of the third model layer; and
    fully contained within the second model layer of the part model;
  selecting a third interior model volume, in the second set of model volumes:
    adjacent the second interior model volume; and
    fully contained within the second model layer of the part model;
  based on the material profile, calculating a second exposure energy predicted to yield a second three-dimensional polymerization geometry intersecting the concave contour of the second upward-facing surface when projected onto the material during the build;
  based on the material profile, calculating a third exposure energy predicted to yield a third three-dimensional polymerization geometry intersecting the concave contour of the second upward-facing surface when projected onto the material during the build, the second three-dimensional polymerization geometry and the third three-dimensional polymerization geometry cooperating to approximate the concave contour of the second upward-facing surface contained within the second superficial model volume;
  populating a second print image with:
    the second exposure energy in a second image area corresponding to the second interior model volume in the second model layer; and
    the third exposure energy in a third image area corresponding to the third interior model volume in the second model layer; and
  storing the second print image in the print file.

15. A method comprising:
accessing a part model comprising a three-dimensional representation of a part;
accessing a material profile of a material selected for the part, the material profile relating exposure energy and three-dimensional polymerization geometry of the material;
segmenting the part model into a set of model layers;
segmenting a first model layer, in the set of model layers, into a first set of model volumes;
segmenting a second model layer, in the set of model layers and above the first model layer, into a second set of model volumes;
detecting a first superficial model volume, in the first set of model volumes of the second model layer, intersecting a first upward-facing surface of the part model;
selecting a first interior model volume, in the first set of model volumes of the first model layer:
  below the second superficial model volume; and
  fully contained within the part model;
based on the material profile, calculating a first exposure energy predicted to yield a first three-dimensional polymerization geometry approximating a first contour of the first upward-facing surface contained within the first superficial model volume when projected onto the material during a build;
populating a first print image with the first exposure energy in a first image area corresponding to the first interior model volume in the first model layer; and
storing the first print image in a print file for the part.

16. The method of claim 15:
wherein accessing the material profile comprises accessing the material profile that predicts:
  horizontal polymerization of the material at a first rate proportional to exposure energy; and
  vertical polymerization of the material at a second rate, less than the first rate, proportional to exposure energy; and
wherein selecting the first interior model volume comprises:
  characterizing a slope of the first contour of the first upward-facing surface;

selecting the first model layer located below the first superficial model volume by a distance inversely proportional to the slope; and selecting the first interior model volume from the first set of model volumes of the first model layer.

17. The method of claim 1:

further comprising:

isolating a subset of interior model volumes, in the set of model layers, fully contained within the part model;

based on the material profile, setting a nominal exposure energy predicted to polymerize a volume of the material corresponding to an interior model volume of the part model;

populating print images, in the print file, with the nominal exposure energy in image areas corresponding to the subset of interior model volumes; and populating a second print image with a null exposure energy in a second image area corresponding to the first superficial model volume in the second model layer; and wherein calculating the first exposure energy comprises calculating the first exposure energy, greater than the nominal exposure energy, predicted to polymerize the material in a part volume:

corresponding to the first interior model volume; and extending vertically into the first superficial model volume toward the first contour.

18. The method of claim 15, further comprising:

serving the print file to an additive manufacturing system; and by the additive manufacturing system:

loading a first layer of the material into a first interstitial volume over a build window; and exposing a first subvolume of the material, in the first layer of the material, with the first exposure energy according to the first print image in the print file to selectively polymerize:

the first subvolume of the material; and a second subvolume of the material:

adjacent the first subvolume of the material;

extending into a preceding part layer of the part corresponding to the second model layer of the part model; and approximating the first contour of the first upward-facing surface in the preceding part layer of the part.

19. A method comprising:

accessing a part model comprising a three-dimensional representation of a part;

accessing a material profile of a material selected for the part, the material profile relating exposure energy and three-dimensional polymerization geometry of the material;

segmenting the part model into a set of model layers;

detecting a first upward-facing surface in the part model;

defining a first model volume:

in a first model layer in the set of model layers;

adjacent the first upward-facing surface; and fully contained within the part model;

based on the material profile, calculating a first exposure energy predicted to yield a first three-dimensional polymerization geometry approximating a first contour of the first upward-facing surface when projected onto the material during a build;

populating a first print image with the first exposure energy in a first image area corresponding to the first model volume in the first model layer; and storing the first print image in a print file for the part.

20. The method of claim 19:

wherein accessing the material profile comprises accessing the material profile that predicts:

horizontal polymerization of the material at a first rate proportional to exposure energy; and vertical polymerization of the material at a second rate, less than the first rate, proportional to exposure energy; and wherein defining the first interior model volume and calculating the first exposure energy comprise:

calculating a slope of the first upward-facing surface;

calculating the first exposure energy proportional to the slope;

calculating the first three-dimensional polymerization geometry based on the first exposure energy; and locating the first model volume to position the first three-dimensional polymerization geometry tangent to the first upward-facing surface.

* * * * *